(12) United States Patent
Ma et al.

(10) Patent No.: US 11,536,890 B2
(45) Date of Patent: Dec. 27, 2022

(54) BACKLIGHT MODULE INCLUDING ANNULAR LIGHT-SHIELDING STRUCTURE AND DISPLAY DEVICE INCLUDING THE SAME

(71) Applicants: Beijing BOE Optoelectronics Technology Co., Ltd., Beijing (CN); BOE Technology Group Co., Ltd., Beijing (CN)

(72) Inventors: Xiao Ma, Beijing (CN); Hao Wu, Beijing (CN); Libao Cui, Beijing (CN); Na An, Beijing (CN); Gang Ci, Beijing (CN); Zheng Zhang, Beijing (CN); Dang Yang, Beijing (CN); Jia Meng, Beijing (CN); Zhenhua Luo, Beijing (CN); Zuoxin Yu, Beijing (CN); Zheng Zong, Beijing (CN); Xuewen Cao, Beijing (CN)

(73) Assignees: Beijing BOE Optoelectronics Technology Co., Ltd., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/478,031

(22) Filed: Sep. 17, 2021

(65) Prior Publication Data

US 2022/0082752 A1 Mar. 17, 2022

(30) Foreign Application Priority Data

Sep. 17, 2020 (CN) .......................... 202022046861.7

(51) Int. Cl.
*F21V 8/00* (2006.01)
*H04M 1/02* (2006.01)
(Continued)

(52) U.S. Cl.
CPC ......... *G02B 6/0051* (2013.01); *G02B 6/0045* (2013.01); *G02B 6/0053* (2013.01);
(Continued)

(58) Field of Classification Search
None
See application file for complete search history.

(56) References Cited

U.S. PATENT DOCUMENTS

2021/0072594 A1\* 3/2021 Zhang ............... G02F 1/133605
2021/0294015 A1\* 9/2021 Yin ...................... G02F 1/13312
(Continued)

FOREIGN PATENT DOCUMENTS

CN 110673390 A \* 1/2020

*Primary Examiner* — Keith G. Delahoussaye
(74) *Attorney, Agent, or Firm* — IPro, PLLC

(57) ABSTRACT

A backlight module and a display device are provided. The backlight module includes: a light source unit; a light guide plate, for guiding light to a display panel; an optical component for uniformly irradiating the display panel; and a back plate, at least including a bottom plate, for accommodating the light guide plate, the light source unit, and the optical component. The light guide plate and the optical component are provided with a hole penetrating through the two, a part of the back plate at the hole is bent and inserted into the hole to form a side wall, a side end surface of the optical component close to the hole is inclined regarding an axis of the hole, and an annular light-shielding structure is around a top surface of the hole.

19 Claims, 2 Drawing Sheets

(51) Int. Cl.
 *G02F 1/1333* (2006.01)
 *G02F 1/1335* (2006.01)
(52) U.S. Cl.
 CPC ......... *G02B 6/0055* (2013.01); *G02B 6/0088* (2013.01); *H04M 1/0264* (2013.01); *H04M 1/0266* (2013.01); *G02F 1/133314* (2021.01); *G02F 1/133524* (2013.01)

(56) References Cited

U.S. PATENT DOCUMENTS

2021/0333466 A1\* 10/2021 Zhou .................... G02B 6/0088
2021/0405446 A1\* 12/2021 Yu ..................... G02F 1/133602

\* cited by examiner

BACKLIGHT MODULE INCLUDING ANNULAR LIGHT-SHIELDING STRUCTURE AND DISPLAY DEVICE INCLUDING THE SAME

CROSS-REFERENCE TO RELATED APPLICATIONS

This application claims priority to Chinese Patent Application No. 202022046861.7 filed in China on Sep. 17, 2020, which is incorporated herein by reference in its entirety.

TECHNICAL FIELD

The present disclosure relates to the technical field of display, and in particular to a backlight module and a display device.

BACKGROUND

Currently, mobile phones in which front cameras are placed in the display areas prevail in market. A perforated screen is a display screen with a high screen-to-body ratio. The perforated screen refers to that a circular hole is formed in the display area of the mobile phone, which is used for arranging functional components, such as a front camera, so as to improve the screen ratio.

SUMMARY

According to an aspect of the present disclosure, a backlight module is provided, which includes:

a light source unit, configured to emit light;

a light guide plate, wherein at least one side surface of the light guide plate is a light incident surface, the light incident surface is close to the light source unit, and the light guide plate is configured to guide the light to a display panel;

an optical component, attached to a light-exiting surface of the light guide plate and configured to uniformly irradiate the display panel with the light; and a back plate, at least comprising a bottom plate, for accommodating the light guide plate, the light source unit, and the optical component;

wherein the light guide plate and the optical component are provided with a hole penetrating through the light guide plate and the optical component, a part of the back plate at the hole is bent and inserted into the hole to form a side wall, a side end surface of the optical component that is close to the hole is inclined with respect to an axis of the hole, and an annular light-shielding structure is provided around a top surface of the hole.

In some embodiments, the optical component comprises a diffusion sheet and a composite prism sheet arranged in a stack, the diffusion sheet is attached to the light-exiting surface of the light guide plate, and a side end surface of the composite prism sheet that is close to the hole is inclined with respect to the axis of the hole.

In some embodiments, the composite prism sheet comprises two prism sheets arranged in a stack, and extension directions of prism structures of the two prism sheets are perpendicular to each other.

In some embodiments, an inclination angle between the side end surface of the optical component and the axis of the hole ranges from 20 degrees to 70 degrees, inclusively.

In some embodiments, a top surface of the side wall is flush with a top surface of the optical component.

In some embodiments, the light-shielding structure is on the top surface of the side wall and the top surface of the optical component.

In some embodiments, the light-shielding structure is on the top surface of the side wall, the top surface of the optical component, and the inclined side end surface of the optical component.

In some embodiments, a side surface of the side wall that is close to the light guide plate is coated with a light absorbing material.

In some embodiments, a surface of the light guide plate that is away from the light-exiting surface is provided with a reflective sheet.

In some embodiments, the annular light-shielding structure is an annular light-shielding tape, and the annular light-shielding tape is adhered around the top surface of the hole.

According to another aspect of the present disclosure, a display device is provided, which includes the backlight module described above.

BRIEF DESCRIPTION OF THE DRAWINGS

The specific implementations of the present disclosure will be described in further detail below in conjunction with the accompanying drawings.

DETAILED DESCRIPTION

Figure 1:
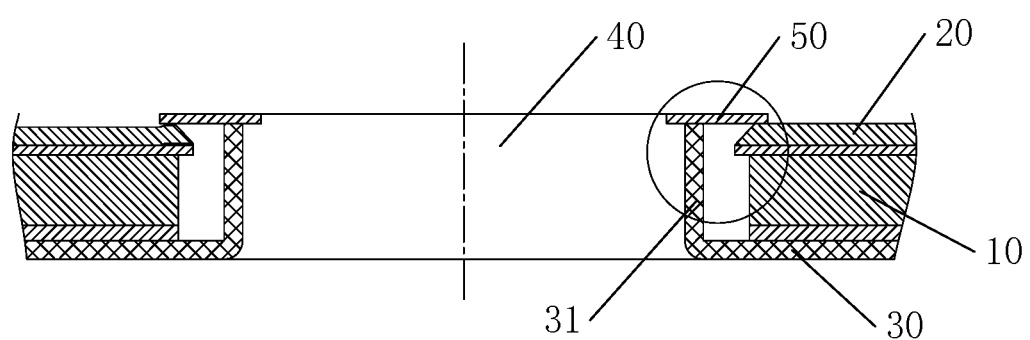
FIG. 1 shows a schematic cross-sectional view of a backlight module according to some embodiments of the present disclosure.

To more clearly illustrate the present disclosure, a further description of the disclosure is provided below in conjunction with some embodiments and the accompanying drawings. Similar parts in the drawings are denoted by the same reference numerals. It should be understood by those skilled in the art that the following detailed description is intended to be illustrative and not restrictive, and that it is not intended to limit the scope of the present disclosure.

In the related technologies, for a perforated screen, a backlight module is required to be perforated, and a display panel needs to be provided with a transparent structure at a corresponding position. This solution is prone to the occurrence of a bright band in the display area at the location of the hole, i.e., a circle of bright edge around the hole, affecting the overall display effect. The specific reason for this phenomenon is that the light emitted by the backlight source is emitted from a light guide plate, and after having been reflected by an iron plate with a shiny surface, a part of the light is emitted into a composite prism through a side surface of the composite prism, then the light is transmitted from the interior of the prism and emitted from the display area; and in terms of light effect, there is a local bright phenomenon in the display area at the periphery of the hole. In view of the above, the surface of the iron plate may be blackened, so that the reflection efficiency of the iron plate is reduced, thereby reducing the incidence of light into the prism, but the process of blackening the iron plate is complicated and the cost of the whole backlight is increased.

Some embodiments of the present disclosure provide a backlight module and a display device such that the display area around the hole of the perforated screen does not shine.

In some embodiments of the present disclosure, the backlight module includes:

a light source unit, configured to emit light;

a light guide plate, where at least one side surface of the light guide plate is a light incident surface, the light incident surface is close to the light source unit, and the light guide plate is configured to guide the light to a display panel;

an optical component, attached to a light-exiting surface of the light guide plate and configured to uniformly irradiate the display panel with the light; and a back plate, which at least includes a bottom plate, configured to accommodate the light guide plate, the light source unit, and the optical component;

the light guide plate and the optical component are provided with a hole penetrating through the two, a part of the back plate at the hole is bent and inserted into the hole to form a side wall, a side end surface of the optical component close to the hole is inclined with respect to an axis of the hole, and an annular light-shielding structure is provided around a top surface of the hole.

In some embodiments, the annular light-shielding structure is an annular light-shielding tape, and the annular light-shielding tape is adhered around the top surface of the hole.

In some embodiments of the backlight module of the present disclosure shown in FIG. 1, the backlight module includes a light source unit, a light guide plate 10, an optical component 20, and a back plate 30.

The liquid crystal display screen is a passive light-emitting element, and the display screen itself does not emit light, but is illuminated by the backlight module below the display screen. The display screen includes the display panel and the backlight module, and the backlight module and the liquid crystal display panel are combined to constitute a liquid crystal display screen. The backlight module is a planar device for uniform illumination, and LED light bars, which serves as light source units, are arranged on two sides or one side of the whole backlight module.

Specifically, the light source unit is arranged adjacent to the light incident surface of the light guide plate 10, and the light emitted by the light source unit enters the light guide plate 10 from the light incident surface and is emitted from the upper surface of the light guide plate 10, namely, the light guide plate 10 may guide the light emitted by the light source unit to the liquid crystal display panel.

In order to make the light uniformly irradiate the liquid crystal display panel, an optical component 20 is provided on the upper surface of the light guide plate 10, namely, on the light-exiting surface of the light guide plate 10, and the light emitted by the light guide plate 10 may uniformly irradiate the liquid crystal display panel after passing through the optical component 20, thereby making the brightness of the liquid crystal display panel uniform.

The back plate 30 includes at least a bottom plate and is for accommodating the light guide plate 10, the optical component 20, and the light source unit. The light guide plate 10 and the optical component 20 are respectively provided with a through hole 40, where the hole 40 may accommodate a functional component, such as a front camera in a mobile phone screen, and the position on the liquid crystal display panel corresponding to the through hole 40 is set as a transparent structure so as to form a perforated screen. A part of the back plate 30 located at the hole 40 is bent towards the interior of the hole 40 and extends into the hole 40 to form a side wall 31, a side end surface of the optical component 20 located near the hole 40 is inclined away from the hole 40, and an annular light-shielding adhesive tape 50 is adhered to the edge of a top surface of the hole 40.

After the light emitted by the light source unit passes through the light guide plate 10, a small amount of light will be incident on the surface of the side wall 31 from the side surface of the light guide plate 10, and enter the optical component 20 through the side end surface of the optical component 20 after being reflected by the side wall 31, thereby forming a bright edge at the edge of the hole 40, and affecting the display effect of the display screen. The side end surface of the optical component 20 of the present disclosure is provided with an inclined structure, so that most of the light reflected by the side wall 31 is absorbed by the light-shielding tape 50 (for example, a light-shielding tape which may be black), reducing the light entering through the side end surface of the optical component 20, thereby improving the lighting effect at the edge of the hole 40, avoiding a bright edge phenomenon around the edge of the hole 40, and improving the display effect of the display screen.

In some embodiments, the optical component includes a diffusion sheet and a composite prism sheet arranged in a stack, the diffusion sheet is attached to a light-exiting surface of the light guide plate, and the side end surface of the composite prism sheet near the hole is inclined with respect to the axis of the hole.

Figure 2:
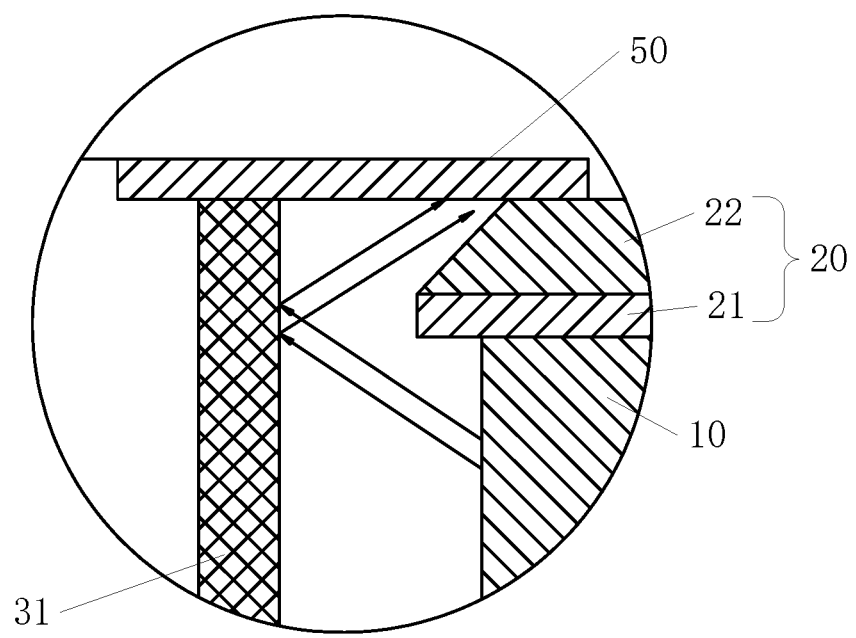
FIG. 2 shows a partial enlarged view of a backlight module according to some embodiments of the present disclosure.

As shown in a partially enlarged view in FIG. 2, in some embodiments of the present disclosure, the optical component 20 includes a diffusion sheet 21 and a composite prism sheet 22, wherein the diffusion sheet 21 is attached to the light-exiting surface of the light guide plate 10 and the composite prism sheet 22 is attached to the surface of the diffusion sheet 21. The side end surface of the composite prism sheet 22 near the hole 40 is inclined away from the hole 40. The annular light-shielding tape 50 is adhered to the edge of the top surface of the hole 40, the inner edge of the annular light-shielding tape 50 is adhered to the top end of the side wall 31 of the back plate, and the outer edge of the light-shielding tape 50 is adhered to the top end of the composite prism sheet 22. In some embodiments, the top end of the side wall 31 is flush with the top end of the optical component 20 to facilitate bonding of the light-shielding tape 50.

Since the side end surface of the composite prism sheet 22 is arranged to be inclined away from the hole 40, light that enters the composite prism sheet 22 after being reflected by the side wall 31 can be reduced, thereby avoiding the generation of bright edge at the edge of the hole 40. It can be understood that the thickness of the diffusion sheet 21 is much smaller than the thickness of the composite prism sheet 22, and light entering the inside of the diffusion sheet through the side end surface of the diffusion sheet 21 is very small, and therefore, the occurrence of the bright edge at the edge of the hole 40 can be avoided by reducing light entering the inside of the composite prism sheet 22 through the side end surface of the composite prism sheet 22.

In some embodiments, the composite prism sheet 22 includes two prism sheets arranged in a stack, and extension directions of the prism structures of the two prism sheets are perpendicular to each other.

Figure 3:
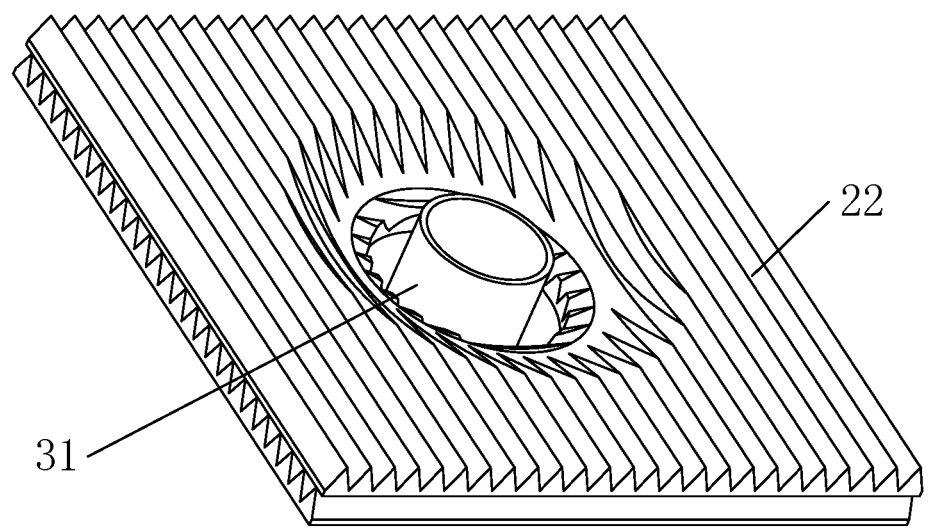
FIG. 3 shows a schematic structural diagram of a composite prism sheet according to some embodiments of the present disclosure.

In some embodiments, as shown in FIG. 3, the composite prism sheet 22 includes two layers of prisms arranged in the stack, the prismatic shapes of the two layers of prisms are perpendicular to each other, and the side end surfaces of the two layers of prisms are arranged to be inclined away from the hole 40. In the manufacturing process, a hole 40 may be formed in the composite prism sheet 22 by means of punching, and an upper knife die of a die used in punching has an inclined shape at a position corresponding to the edge of the hole, so that the periphery of the outer side edge of the hole forms an inclined shape after punching. With this solution, the prism punching die is easy to machine, the cost of the die is not increased, and the cost of the corresponding backlight is not increased.

In some embodiments, the side end surface of the optical component 20 is inclined at an angle in the range of 20 to 70 degrees (inclusively) from the horizontal. In this angular range, the light incident to optical component from the side end surface of the optical component 20 can be reduced.

Figure 4:
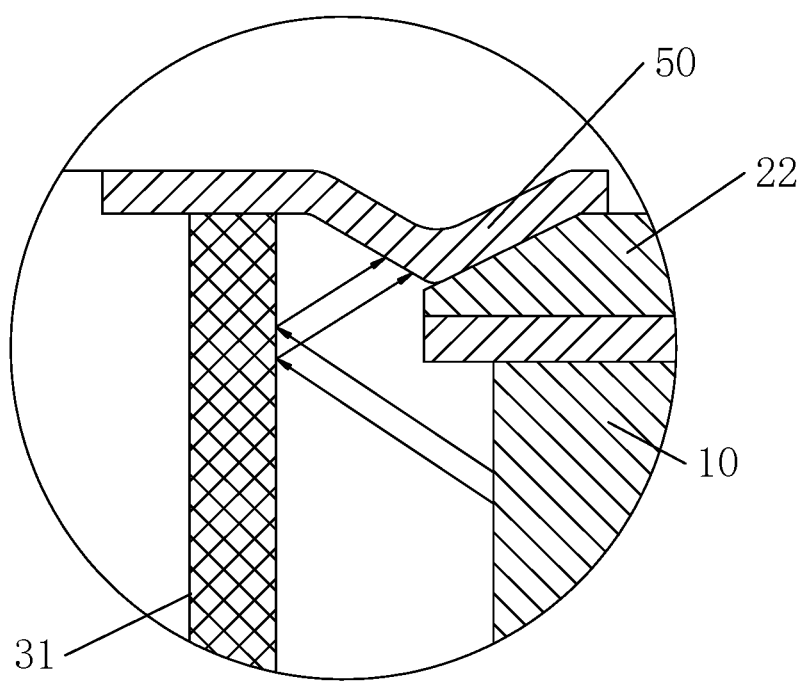
FIG. 4 shows a partial enlarged view of a backlight module according to some embodiments of the present disclosure.

As shown in FIG. 4, in some embodiments, the annular light-shielding tape 50 is adhered at the edge of the hole 40, specifically, the inner edge of the light-shielding tape 50 is adhered to the top end of the side wall 31, and the outer edge of the light-shielding tape 50 is adhered to the inclined side end surface and the top surface of the optical component 20. The light reflected by the side wall 31 is absorbed by the light-shielding tape 50, further reducing the light incident into the optical component from the side end surface of the optical component 20.

In some embodiments, the side surface of the side wall 31 near the light guide plate 10 is coated with a light absorbing material (which may be, for example, a black light absorbing layer), which can reduce the light reflecting effect of the side wall 31, thereby reducing light incident into the optical component from the side end surface of the optical component 20.

In some embodiments, a surface of the light guide plate 10 away from the light-exiting surface is provided with a reflection sheet, and after the light emitted by the light source unit is incident on the light guide plate 10, the reflection sheet may make the light exit from the light-exiting surface of the light guide plate 10 and reduce the light emitted from the side end surface of the light guide plate 10.

The present disclosure further provides a display device, which includes the backlight module described above.

The display device may be any product or component with display function such as television, display, digital photo frame, mobile phone, tablet computer, etc. The display device further includes a flexible circuit board, a printed circuit board, etc.

In the embodiments of the present disclosure, by arranging the side end surface of the optical component in an inclined shape, most of the light reflected by the side wall of the back plate is absorbed by the light-shielding tape, light rays entering through the side end surface of the optical component are reduced, thereby improving the light effect at the edge of the hole, avoiding a bright edge phenomenon around the edge of the hole, and improving the display effect of the display screen.

It will be apparent that the above-mentioned embodiments of the present disclosure are merely examples for clearly illustrating the present disclosure, rather than limiting the embodiments of the present disclosure, and that various other changes and modifications may be made by those skilled in the art based on the above description. It is not possible to enumerate all implementations herein, and all apparent changes and modifications evolving from the technical solutions of the present disclosure fall within the scope of the present disclosure.

What is claimed is:

1. A backlight module, comprising:
a light source unit, configured to emit light;
a light guide plate, wherein at least one side surface of the light guide plate is a light incident surface, the light incident surface is close to the light source unit, and the light guide plate is configured to guide the light to a display panel;
an optical component, attached to a light-exiting surface of the light guide plate and configured to uniformly irradiate the display panel with the light; and
a back plate, at least comprising a bottom plate, for accommodating the light guide plate, the light source unit, and the optical component;
wherein the light guide plate and the optical component are provided with a hole penetrating through the light guide plate and the optical component, a part of the back plate at the hole is bent and inserted into the hole to form a side wall, a side end surface of the optical component that is close to the hole is inclined with respect to an axis of the hole, and an annular light-shielding structure is provided around a top surface of the hole,
wherein a top surface of the side wall is flush with a top surface of the optical component,
wherein the light-shielding structure is on the top surface of the side wall, the top surface of the optical component, and the inclined side end surface of the optical component.

2. A backlight module, comprising:
a light source unit, configured to emit light;
a light guide plate, wherein at least one side surface of the light guide plate is a light incident surface, the light incident surface is close to the light source unit, and the light guide plate is configured to guide the light to a display panel;
an optical component, attached to a light-exiting surface of the light guide plate and configured to uniformly irradiate the display panel with the light; and
a back plate, at least comprising a bottom plate, for accommodating the light guide plate, the light source unit, and the optical component;
wherein the light guide plate and the optical component are provided with a hole penetrating through the light guide plate and the optical component, a part of the back plate at the hole is bent and inserted into the hole to form a side wall, a side end surface of the optical component that is close to the hole is inclined with respect to an axis of the hole, and an annular light-shielding structure is provided around a top surface of the hole,
wherein the optical component comprises a diffusion sheet and a composite prism sheet arranged in a stack, the diffusion sheet is attached to the light-exiting surface of the light guide plate, and a side end surface of the composite prism sheet that is close to the hole is inclined with respect to the axis of the hole.

3. The backlight module according to claim 1, wherein the composite prism sheet comprises two prism sheets arranged in a stack, and extension directions of prism structures of the two prism sheets are perpendicular to each other.

4. The backlight module according to claim 1, wherein an inclination angle between the side end surface of the optical component and the axis of the hole ranges from 20 degrees to 70 degrees, inclusively.

5. The backlight module according to claim 1, wherein a top surface of the side wall is flush with a top surface of the optical component.

6. The backlight module according to claim 5, wherein the light-shielding structure is on the top surface of the side wall and the top surface of the optical component.

7. The backlight module according to claim 5, wherein the light-shielding structure is on the top surface of the side wall, the top surface of the optical component, and the inclined side end surface of the optical component.

8. The backlight module according to claim 1, wherein a side surface of the side wall that is close to the light guide plate is coated with a light absorbing material.

9. The backlight module according to claim 1, wherein a surface of the light guide plate that is away from the light-exiting surface is provided with a reflective sheet.

10. The backlight module according to claim 1, wherein the annular light-shielding structure is an annular light-shielding tape, and the annular light-shielding tape is adhered around the top surface of the hole.

11. A display device, comprising a backlight module, wherein the backlight module comprises:
    a light source unit, configured to emit light;
    a light guide plate, wherein at least one side surface of the light guide plate is a light incident surface, the light incident surface is close to the light source unit, and the light guide plate is configured to guide the light to a display panel;
    an optical component, attached to a light-exiting surface of the light guide plate and configured to uniformly irradiate the display panel with the light; and
    a back plate, at least comprising a bottom plate, for accommodating the light guide plate, the light source unit, and the optical component;
    wherein the light guide plate and the optical component are provided with a hole penetrating through the light guide plate and the optical component, a part of the back plate at the hole is bent and inserted into the hole to form a side wall, a side end surface of the optical component that is close to the hole is inclined with respect to an axis of the hole, and an annular light-shielding structure is provided around a top surface of the hole,
    wherein the optical component comprises a diffusion sheet and a composite prism sheet arranged in a stack, the diffusion sheet is attached to the light-exiting surface of the light guide plate, and a side end surface of the composite prism sheet that is close to the hole is inclined with respect to the axis of the hole.

12. The display device according to claim 11, wherein the composite prism sheet comprises two prism sheets arranged in a stack, and extension directions of prism structures of the two prism sheets are perpendicular to each other.

13. The display device according to claim 11, wherein an inclination angle between the side end surface of the optical component and the axis of the hole ranges from 20 degrees to 70 degrees, inclusively.

14. The display device according to claim 11, wherein a top surface of the side wall is flush with a top surface of the optical component.

15. The display device according to claim 14, wherein the light-shielding structure is on the top surface of the side wall and the top surface of the optical component.

16. The display device according to claim 14, wherein the light-shielding structure is on the top surface of the side wall, the top surface of the optical component, and the inclined side end surface of the optical component.

17. The display device according to claim 11, wherein a side surface of the side wall that is close to the light guide plate is coated with a light absorbing material.

18. The display device according to claim 11, wherein a surface of the light guide plate that is away from the light-exiting surface is provided with a reflective sheet.

19. The display device according to claim 11, wherein the annular light-shielding structure is an annular light-shielding tape, and the annular light-shielding tape is adhered around the top surface of the hole.

* * * * *